Patented May 27, 1941

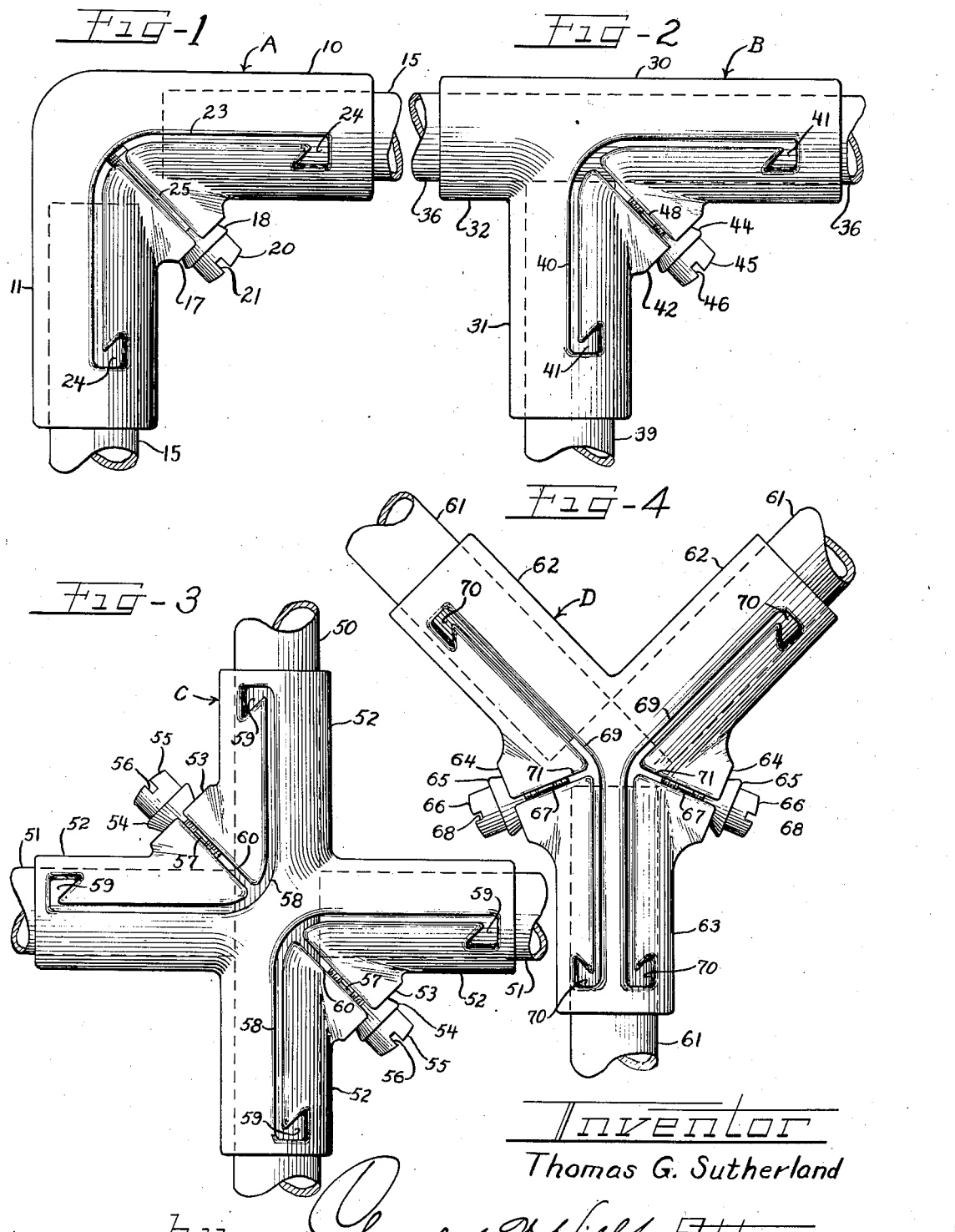

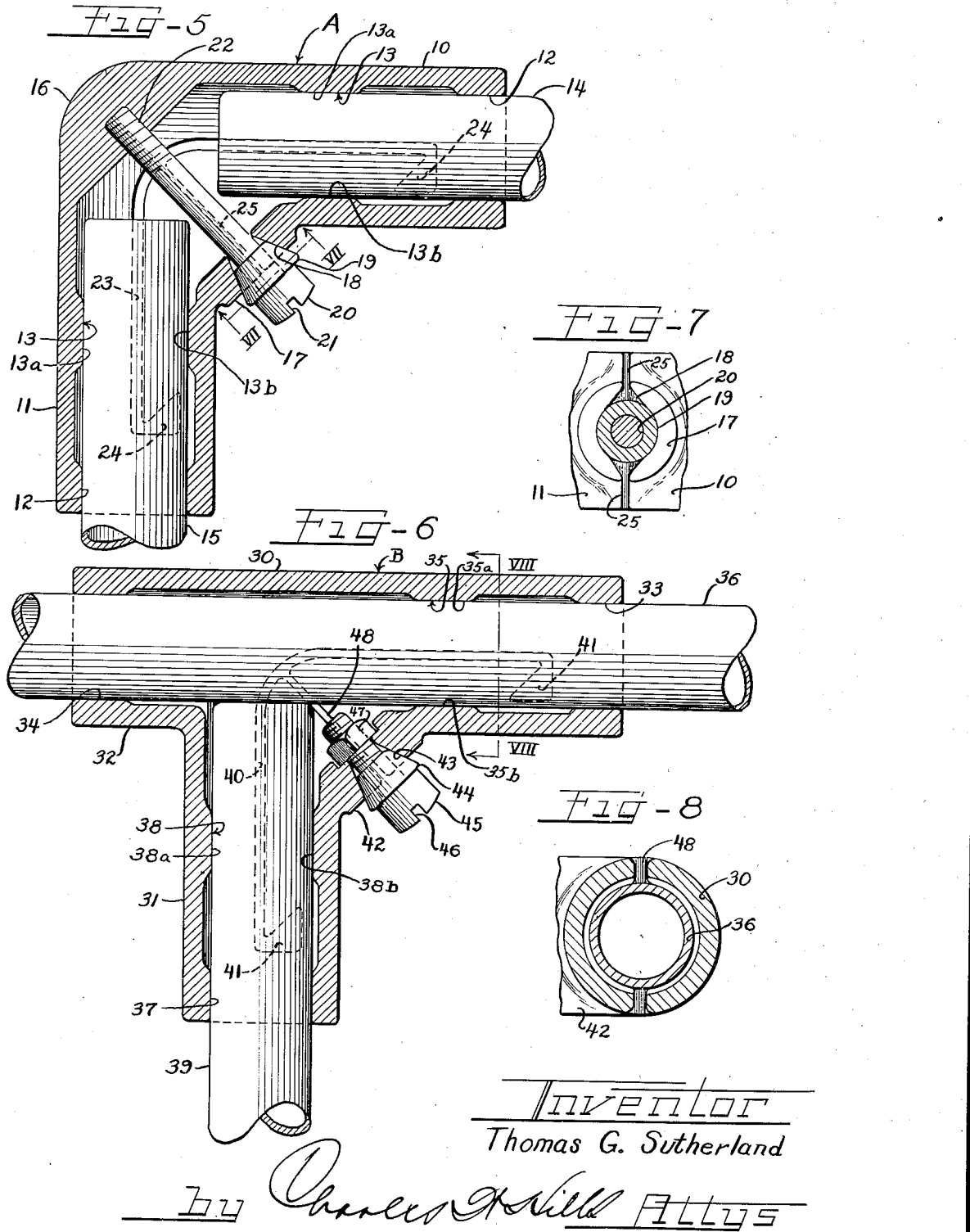

2,243,687

UNITED STATES PATENT OFFICE 2,243,687

PIPE FITTING

Thomas G. Sutherland, Chicago, Ill.

Application November 13, 1939, Serial No. 304,005

18 Claims. (Cl. 287—54)

The present invention relates to pipe fittings which are used for coupling a plurality of pipes together and is more particularly directed to a pipe fitting which couples tubing, pipes, or the like having thin wall sections without marring, distorting or collapsing any portions thereof.

The objection to the use of couplings utilizing set screws, bolts which pass through the pipes, or band clamps is that the walls of the tubing or pipe are sometimes marred, distorted or collapsed when coupled together, thus resulting in a loose combination or connection.

Thinly walled pipes or tubings are generally used in making display stands of the character used by clothing dealers and the like. The clothes are suspended by hangers carried from the rails of the stand, and the stand is usually mounted on rollers for ease of mobility from place to place in a store or showroom. Pipes or tubings are also used for laborers' stages and other similar structures.

It is very desirable that a coupling or fitting be used to build these structures which may easily be assembled by store clerks, laborers or the like without having the coupled portions of the pipes or tubing injured in any way.

While the present invention has been described as a coupling for use in making a display stand, it should be understood that it can be used for coupling pipes or tubing of any size or character, regardless of the type of structure to be formed.

It is therefore an important object of this invention to provide a pipe fitting for coupling a plurality of thinly walled pipes or tubing without crushing the walls or marring the surfaces thereof.

Another object of the present invention is the provision of a simple and inexpensive pipe fitting or coupling which may easily be assembled with pipes, tubing or the like by store clerks or laborers.

A further object of this invention is the provision of a pipe fitting so formed that a plurality of pipes or tubing may be coupled together in angular relation.

One of the features of the invention is to provide a hollow pipe fitting having resilient integral portions capable of being held in a flexed position to frictionally couple together a plurality of inserted pipes or tubing.

Another feature of the invention is the provision of a hollow metal pipe fitting having angularly arranged legs for receiving portions of pipes or tubing therein and slots in the walls of the legs to form resilient portions which are capable of being flexed by a wedging action for the purpose of gripping and holding the received portions of the pipes or tubing.

A further feature of the invention is the provision of a hollow metal pipe fitting having slotted walls and angularly arranged legs with a boss, formed at the angle between the legs, that is, cored to receive a conical washer through which extends a threaded bolt adjustingly engaging a nut at its inner end whereby a tightening of the bolt results in a wedging action in a manner to flex portions of the legs into holding engagement with pipes or tubing inserted therein.

This invention has for a further object the provision of a hollow metal pipe fitting having inner seats arranged in axially spaced relation for bearing against the surfaces of inserted pipes or tubing.

The present invention also has the novel feature of a hollow cast metal fitting which is provided with slots in the walls thereof to form yieldable floating portions, the design and shape of the slots being such as to permit ease in casting.

The above, other and further objects and novel features of the present invention will be apparent from the following description and accompanying drawings.

The accompanying drawings illustrate embodiments of the present invention, and the views thereof are as follows:

Figure 1 is a side elevational view of one embodiment of the present invention illustrating the coupling of pipes or tubing in an elbow pipe fitting;

Figure 2 is a side elevational view, similar to Figure 1, of another embodiment of this invention illustrating a T pipe fitting;

Figure 3 is a view, similar to Figure 1, of another embodiment of this invention illustrating a cross pipe fitting;

Figure 4 is a view, similar to Figure 1, of another embodiment of this invention illustrating a Y pipe fitting;

Figure 5 is a vertical sectional view, with parts in elevation, of the elbow pipe fitting illustrated in Figure 1;

Figure 6 is a vertical sectional view, with parts in elevation, of the T pipe fitting illustrated in Figure 2;

Figure 7 is a transverse sectional view illustrating parts in broken elevation, taken substantially along the plane indicated by the line VII—VII of Figure 5;

Figure 8 is a transverse sectional view illustrating parts in broken elevation, taken substanstantially along the plane indicated by the line VIII—VIII of Figure 6.

As shown on the drawings:

The pipe fitting or coupling as illustrated in Figures 1, 5 and 7, is designated generally by the reference character A. As shown, the pipe fitting A is a hollow metal housing having tubular legs 10 and 11 connected in right angular relation. Each of the legs 10 and 11 is recessed around its inside diameter in a manner to provide inner seats or lands 12 and 13 arranged in axially spaced relation. The diameters of the seats 12 and 13 are sufficiently large to slidingly receive the end portions of pipes or tubing 14 and 15.

It should be understood that while the pipe fitting illustrated in Figures 1 and 5 is shaped to receive pipes or tubing of equal diameters, the pipe fitting can also be shaped to receive pipes of different diameters.

A thick wall portion 16 is provided at the outer corner of the junction of the legs 10 and 11, the purpose of which will be fully described hereinafter. A boss 17 is formed at the other or inside corner of the junction between the two legs. An aperture 18, in the boss 17, is shaped to receive in seated relation a frusto-conical washer 19. A cap screw 20, having a slot 21 in the head thereof, extends through the washer 19 into threaded engagement with an inwardly opened tapped recess 22 provided in the thick wall portion 16.

A pair of diametrically opposed slots 23 extend longitudinally along the pipe fitting A for a major portion of its length on both sides thereof and terminate at their ends in triangularly shaped openings 24. It is to be noted that the slots 23 are arranged in coextensive relation with the general contour of the pipe fitting and terminate at points adjacent the free ends of the legs 10 and 11. As best shown in Figure 1, the opposed slots 25 extend in line with the bolt 20 to connect the aperture 18 and the slots 23.

When the parts are positioned as illustrated in Figure 5, a tightening of the cap screw 20 urges the washer 19 towards the outside corner of the pipe fitting A, thereby exerting a wedging action which tends to increase the width of the slots 25. The clamping portions of the pipe fitting included between the slots 25 and the end openings 24 are urged inwardly, thereby decreasing the width of the slots 23 and the diameters of the inner seats 13. These triangularly shaped openings 24 provide means for absorbing stresses which will localize at the ends of the slots 23 when the above mentioned wedging action takes place. They also provide an offset fulcrum around which the clamping portions, defined by the slots in the legs 10 and 11, may be flexed. It is to be noted that the slots 23 divide the seats 13 into upper halves 13a and lower halves 13b.

When the cap screw 20 is tightened to effect a wedging action, only the half seat portions 13b are moved from their normal positions. As the half seat portions 13b move in a direction toward the half seat portions 13a, a full surface clamping action is effected upon the inserted pipes 14 and 15 by the seats 13, and the pipes are slightly tilted into less than full surface contact by the seats 12. A greater frictional gripping action is accomplished in this manner than if the seats 12 and 13 were clamped tightly about the inserted pipe portions they surround.

Another embodiment of the present invention is illustrated in Figures 2, 6 and 8. The pipe fitting or coupling of this embodiment is generally designated by the reference character B and consists of two legs 30 and 31 angularly connected to form a T member. The wall sections of the members A and B are alike in every respect, with the exception of the provision of an extension portion 32 on the leg 30 of the member B, whereas the legs 10 and 11 of the member A terminate in a thickened wall portion 16.

As best illustrated in Figure 6, the inner portions of the leg 30 are recessed to provide inner seats or lands 33 and 34 at the respective ends thereof. A similar inner seat 35 is provided between but in closer spaced relation from the seat 33 than the seat 34. The diameters of the seats 33, 34 and 35 are such as to slidingly receive a pipe or tubing 36.

The leg 31, which is connected to the leg 30 in right-angular relation, is shaped in the same manner as the leg 11 of the previous embodiment and provides an inner seat 37 at its free end and an inner seat 38 in spaced relation therefrom. The diameters of the seats 37 and 38 are such as to slidingly receive the end portion of a pipe or tubing 39.

A pair of diametrically opposed slots 40 are provided in the walls of the member B in the same manner and for the same purpose as the slots 23 of the member A. These slots terminate in triangularly-shaped openings 41, one pair of these openings being positioned between the inner seats 37 and 38 of the leg 31 and the other pair of the openings being positioned between the inner seats 33 and 35 of the leg 30.

A boss 42 is provided at the junction between the wall portions of the legs 30 and 31 which are included between the slots 40. The boss 42 is cored as at 43 to receive in seated relation a frusto-conical washer 44. A bolt 45 having a head slot 46, by means of which the bolt may be rotated by a screw driver or the like, extends through the washer 44 into threaded engagement with a nut 47 which seats against the recessed inside surface of the boss 42. A pair of opposed slots 48 is provided in the walls of the pipe fitting at the junction between the legs 30 and 31 and extend coaxially with the bolt 45 to connect the washer receiving aperture 43 and the slots 40.

By tightening the threaded engagement between the bolt 45 and nut 47, the washer 44 is urged into the aperture 43 to effect a wedging action therein. This wedging action reduces the diameter of the inner seat 38 by urging the half seat 38b in a direction toward the half seat 38a. A tilting or cocking of the pipe 39 relative to the seat 37 effects a clamping of the pipe 39 within the leg 31 in exactly the same manner as described in the pipe fitting A. At the same time, the wedging action moves the lower half 35b of the inner seat 35 towards the upper half of the seat 35a. Because the pipe 36 is supported by the spaced seats 33 and 34, the intermediate force applied at the seat 35b results in the pipe being clamped securely within the leg 30.

It should be understood that a wedging action sufficient to clamp the pipe within the legs of the pipe fitting may be applied without injuring such pipes or tubing in any way.

Figures 3 and 4 disclose two additional embodiments of the present invention which include features common to the above described embodiments.

The pipe fitting illustrated in Figure 3 is a cross pipe fitting generally designated by the reference character C. This pipe fitting may be formed as a combination of two pipe fittings A, as shown in Figure 5, by joining their outer corners 16 at the junction between the right angularly disposed legs. While this might be accomplished as by welding, the pipe fitting C is preferably made of a one-piece casting, being longitudinally hollow in two directions. In this form, the pipe fitting C is capable of receiving a pipe or tubing which extends through two oppositely disposed legs. The other pair of oppositely disposed legs are capable of receiving the ends of pipes or tubing to be held in clamped position. The member C can also clampingly receive the free ends of four separate pipes or tubing.

As illustrated in Figure 3, a pipe or tubing 50 extends through the cross pipe fitting C in one direction while the free ends of a pair of pipes or tubing 51 are received within the pair of legs extending in the opposite direction. The cross pipe fitting C is shaped to provide four similar legs 52, each extending in right angular relation to an adjacent leg. Each of the legs 52 has provided on its inner side a pair of seats or lands (not shown) in axially spaced relation similar to the seats or lands as shown in the legs 10 and 11 of Figure 5.

A pair of oppositely disposed bosses 53 are provided at the inside junctions of adjacent legs 52. Each of these bosses is cored to seatingly receive a frusto-conical washer 54. A short bolt 55, having a head slot 56, extends through the washer 54 into threaded engagement with a nut 57. The washer, nut and bolt combination is positioned and actuated in the same manner as the combination shown in Figure 6.

Two pairs of diametrically opposed slots 58 are provided in the walls of the fitting C, having curved portions near the center of the cross fitting with extensions in adjacent legs 52 and terminating in triangularly-shaped openings 59. Slots 60 extending toward the center of the fitting C to connect the cored apertures which receive the washers 54 and the curved portions of the slots 58.

When the bolts 55 are threaded towards the center of the cross fitting C, washers 54 exert a wedging action against the floating portions of the legs 52 which are defined by the slots 58. The wedging action induced by threading each of the bolts 55 results in a clamping action on pipes or tubing inserted in the legs 52 adjacent the bolts. The clamping action is the same as that described in connection with Figures 5 and 6.

Figure 4 illustrates a Y pipe fitting generally designated by the reference character D. In this embodiment, the free ends of three pipes or tubing 61 may be clamped in a Y-angular relation. The Y pipe fitting D provides a pair of legs 62 in right angular relation with each other and a third leg 63 in obtuse angular relation with the legs 62.

Each of the legs 62 and 63 is formed to provide inner seats or lands, not shown, similar to the axially spaced seats as illustrated in the legs 10 and 11 of the pipe fitting A of Figure 5. A pair of opposed bosses 64 is formed at the junctions between the leg 63 and each of the legs 62. Each of the bosses 64 is cored to seatingly receive a frusto-conical washer 65. A short bolt 66 extends through the washer 65 into threaded engagement with a nut 67. A slot 68 is formed in the head of the bolt 66 whereby the bolt may be turned by a screw driver or the like. The bolt and washer combination of Figure 4 is similar to the bolt and washer combination clearly illustrated in Figure 6.

Two pairs of diametrically opposed slots 69 are provided in the walls of the fitting D, each pair having extensions in the legs 62 and 63 and terminating in triangularly-shaped openings 70. A pair of slots 71 connect the apertures which receive the washers 65 and the slots 69. When the bolts 66 are threaded inwardly, the washers 65 effect a wedging action which results in a clamping of the received portions of the pipes 61 in the manner described in the previous embodiment.

The invention has been described herein more or less precisely as to details, yet it is to be understood that the invention is not limited thereby, as changes may be made in the arrangement and proportion of parts, and equivalents may be substituted, without departing from the spirit and scope of the invention.

I claim as my invention:

1. A coupling comprising a hollow metal housing adapted to receive tubes, rods and the like therein, said housing having a longitudinal slot extending intermediate the ends thereof and a laterally extending slot terminating in said first slot intermediate its ends, said slots extending radially through the side walls of said housing, and means for expanding said laterally extending slot for contracting said first slot to draw the housing into tight engagement with the inserted tubes, rods and the like.

2. A coupling comprising a hollow metal housing adapted to receive tubes, rods and the like therein, said housing having a longitudinal slot terminating short of the ends thereof, said housing including a wedge receiving portion with a slot therethrough intersecting at an angle with the longitudinal slot, and a wedging device in said portion to expand said second slot for contracting the longitudinal slot to tighten the housing around the inserted tubes, rods and the like.

3. A coupling comprising a hollow metal housing adapted to receive tubes, rods and the like therein, said housing having a longitudinal slot terminating short of the ends thereof, said housing also having a second slot intersecting at an angle with the longitudinal slot, and means associated with one of said slots for expanding said slot and contracting said other slot whereby said housing is tightened around the inserted tubes, rods and the like.

4. A coupling comprising a one-piece hollow metal housing shaped to provide angularly extending portions adapted to receive tubes, rods and the like therein, said housing having longitudinal slots extending intermediate the ends of said angularly extending portions, said housing also having other slots which intersect at an angle with said longitudinal slots, said slots together defining separated portions on said housing, each of said portions being integral with one of said angularly extending portions and capable of being flexed, and means for flexing said separated portions by changing the width of said slots in such a manner that the angularly extending portions frictionally retain said inserted tubes, rods and the like.

5. A coupling comprising a one-piece hollow metal housing having angularly extending portions adapted to receive tubes, rods and the like therein, said housing having pairs of opposed slots defining an integral flexible portion carried by each of said angularly extending portions, and means for flexing said flexible portions by expanding certain of said pairs of slots while contracting other pairs of said slots whereby said flexible portions are tightened around the inserted tubes, rods and the like.

6. A coupling comprising a one-piece tubular metal housing having a plurality of angularly disposed tubular legs adapted to receive tubes, rods and the like therein, said housing being provided with opposed slots extending into adjacent legs and terminating adjacent their ends, said housing being provided with other opposed slots intersecting at an angle with said first slots, and a wedging device to expand said other slots for contracting said first slots to thereby tighten said tubular legs around the inserted tubes, rods and the like.

7. A coupling comprising a one-piece tubular metal housing having a plurality of angularly disposed tubular legs adapted to receive tubes, rods and the like therein, said housing being provided with a pair of opposed slots extending longitudinally into a pair of adjacent legs and terminating adjacent their ends, said housing being provided with another pair of opposed slots intersecting at an angle with said first pair of slots, and a wedging device to expand said other pair of slots for contracting said first pair of slots to thereby tighten said tubular legs around the inserted tubes, rods and the like.

8. A coupling comprising a one-piece tubular metal housing having walls forming angularly disposed tubular legs adapted to receive tubes, rods and the like therein, the walls of said housing being provided with opposed slots extending longitudinally into a pair of adjacent legs and terminating adjacent their ends in enlarged openings, the junction of said legs forming inner and outer corners, one of said corners being formed as an apertured boss, the walls of said housing being provided with other opposed slots intersecting said first slots at an angle and extending to connect with the aperture in said boss, said slots defining flexible wall portions carried by said legs, a tapered washer in the aperture of said boss, a headed bolt extending through said washer, and means for drawing said headed bolt against said washer whereby a wedging action expands said other slots and moves said flexible wall portions into holding engagement with said inserted tubes, rods and the like.

9. A coupling comprising a tubular metal housing having walls forming a pair of angularly disposed leg portions adapted to receive tubes, rods and the like therein, said walls at the junction of said leg portions having an inwardly opening threaded recess at one corner and an apertured boss at the opposite corner, a tapered washer in the aperture of said boss, a threaded bolt extending through said washer into threaded engagement with the inwardly opening recess, the walls of said housing being provided with a pair of opposed slots extending longitudinally into both leg portions of the housing, said slots having enlarged openings at their terminal ends spaced inwardly of the ends of the leg portions, said walls being provided with a second pair of opposed slots intersecting said first slots and the aperture of said boss, said pairs of slots defining flexible wall portions which flex in a direction transversely of said leg portions when said bolt is threaded into its engaging recess to thereby frictionally hold the inserted ends of said tubes, rods and the like.

10. A coupling comprising a tubular metal housing having walls forming a pair of angularly disposed leg portions adapted to receive tubes, rods and the like therein, each of said leg portions having an inside land formed at its end and another inside land spaced inwardly from said first land, said lands being formed to slidingly receive said inserted tubes, rods and the like, the walls of said housing having opposed slots extending into said leg portions and terminating between said spaced lands in enlarged openings, an apertured boss formed at the junction of the walls of said leg portions, the walls of said housing having other opposed slots intersecting said first slots at an angle and connecting said first slots and the aperture of said boss, said slots defining movable integral portions on said leg portions, a tapered washer in the aperture of said boss, a headed bolt extending through said washer, and means for drawing said headed bolt against said washer for exerting a wedging action between said other slots whereby said movable portions are flexed into holding engagement with said inserted tubes, rods and the like.

11. A coupling comprising a tubular metal housing having walls forming angularly disposed legs adapted to receive tubes, rods and the like therein, each of said legs having a pair of inside lands, one of said lands being formed at the end of the leg and the other of said lands being axially spaced inwardly from said first land, said lands being formed to slidingly receive said inserted tubes, rods and the like, the walls of said housing having pairs of opposed slots extending into adjacent legs and terminating between said spaced lands in enlarged openings, an apertured boss formed at each junction of said adjacent slotted legs, the walls of said housing having other pairs of opposed slots intersecting said first pairs of slots and the aperture of said boss, said slots defining integral movable portions of said adjacent legs, a tapered washer seated in the aperture of said boss, a threaded bolt extending through said washer, and a nut seated against said boss on the side opposite said washer for threadingly engaging said bolt, said bolt when threaded into said nut effecting a wedging action between said washer and said other pairs of slots to flex said movable portions into holding engagement of the inserted tubes, rods and the like.

12. A coupling comprising a housing adapted to receive tubes, rods and the like therein, said housing having an intermediate localized portion composed of the entire thickness of the housing side walls and fulcrumed on the side walls at a position spaced from the ends of the housing to provide a clamping member, and means between said localized portion and an adjacent portion of the housing side walls for flexing said clamping member against a portion of the said inserted tubes, rods and the like.

13. A coupling comprising a housing having hollow portions adapted to receive inserts, said housing having localized side wall portions spaced from the ends thereof and isolated from the housing by radial gaps through the housing and fulcrumed on the housing to provide a clamping member for and associated with each of said hollow portions, and means between said clamping members for flexing them into holding engagement with the insert.

14. A coupling comprising a hollow metal housing adapted to receive tubes, rods and the like therein, said housing having a longitudinal slot terminating in spaced relation from the ends of the housing and a second slot extending angularly from and terminating intermediate the ends of said longitudinal slot, said slots extending radially through the side walls of said housing, and means for expanding said second slot for contracting said longitudinal slot to draw the housing into tight engagement with the inserted tubes, rods and the like, the axis of movement of said expanding means passing through the intersection of said slots.

15. A coupling comprising a housing having angularly disposed hollow portions adapted to receive tubes, rods and the like therein, clamping members between said hollow portions arranged for movement toward and away from the angle between the hollow portions, and wedging means between said clamping members for effecting said movement to frictionally retain said tubes, rods and the like in said hollow portions.

16. A coupling comprising a housing, a plurality of hollow leg portions on said housing extending in angular relation to each other and arranged to receive tubes, rods and the like therein, a pair of clamping members between each pair of adjacent leg portions arranged to fulcrum on the leg portions, and means for flexing said fulcrumed clamping members into holding engagement of the inserted tubes, rods and the like.

17. A coupling comprising a housing, hollow leg portions on said housing extending in angular relation to each other and arranged to receive tubes, rods and the like therein, a flexible clamping member on each leg portion arranged to terminate in the angle between said leg portions, and wedging means between adjacent ends of said clamping members for flexing them into holding engagement of the inserted tubes, rods and the like.

18. A coupling comprising a housing, hollow legs on said housing extending in angular relation to each other and arranged to receive tubes, rods and the like therein, adjacent flexible clamping members on said legs formed by slots in the legs, said slots extending from the angle between said legs to points adjacent the ends of the legs, and wedging means between said adjacent clamping members for flexing them into holding engagement of the inserted tubes, rods and the like.

THOMAS G. SUTHERLAND.